United States Patent Office 3,397,226
Patented Aug. 13, 1968

3,397,226
PREPARATION OF ESTERS FROM OLEFINS
Donald M. Fenton, Anaheim, Calif., assignor to Union Oil Company of California, Los Angeles, Calif., a corporation of California
No Drawing. Continuation-in-part of application Ser. No. 375,342, June 15, 1964. This application Jan. 18, 1965, Ser. No. 426,382
8 Claims. (Cl. 260—486)

ABSTRACT OF THE DISCLOSURE

The invention comprises the oxidative carbonylation of hydrocarbon olefins in the presence of an alcohol reactant to produce esters of unsaturated carboxylic acids, esters of dicarboxylic acids and esters of beta-alkoxy-substituted carboxylic acids. The reaction is performed in the presence of a catalyst comprising a platinum group metal salt or chelate and a multivalent heavy metal salt which functions as a redox agent to maintain the platinum group metal in an elevated oxidation state. Oxygen is introduced into contact with the reactants to regenerate the multivalent metal salt and maintain it in an elevated oxidation state to provide a continuous process. The reaction is performed at a temperature from about 0° to 300° C. and a pressure from atmospheric to about 2500 p.s.i.g. and is preferably performed in liquid phase. In specific embodiments the invention comprises the reaction of ethylene with carbon monoxide and ethanol to produce ethyl acrylate. Byproducts also produced during the reaction include from diethyl succinate and ethyl beta-ethoxypropionate. The latter ester can be pyrolyzed to ethyl acrylate and ethanol.

DESCRIPTION OF THE INVENTION

This application is a continuation-in-part of my copending application Ser. No. 375,342, filed June 15, 1964.

This invention relates to a method for the preparation of esters from olefins and includes the preparation of esters of unsaturated acids, esters of dicarboxylic acids and esters of beta-alkoxy acids. In a specific embodiment, this invention prescribes a method for the direct preparation of acrylates and succinates from ethylene.

The aforementioned esters are valuable chemicals having established commercial markets, e. g., acrylate esters are commonly employed as monomers and the succinates are commonly employed as plasticizers for various synthetic resins. Heretofore, there has been no simple preparation of the aforementioned esters directly from olefins. On the contrary, most acrylate esters have been produced by relatively complex chemistry which contributes to the high cost of the compounds and limits their commercial utilization. Commercially, most acrylate esters are produced from acetylene by the oxo process employing a carbonyl catalyst, although some acrylates are also produced from beta-propiolactone and for ethylene cyanohydrin. Almost the entire production of methacrylates is derived from acetone and hydrogen cyanide by a fairly complex series of reactions.

It is an object of this invention to provide a direct method of preparation of esters from olefins.

It is also an object of this invention to provide a direct method for the preparation of esters of unsaturated acids.

It is a further object of this invention to provide a method for the preparation of esters of dicarboxylic acids from olefins.

It is a specific object of this invention to provide a preparation of succinate and acrylate esters from ethylene.

I have now found that esters of carboxylic acids such as alkyl acrylates and dialkyl succinates can be readily obtained from hydrocarbon olefins, particularly ethylene, by contacting the olefin and carbon monoxide with a substantially anhydrous alcoholic solution of a soluble salt of a platinum group metal in a high oxidation state. The reaction results in a stoichiometric production of the platinum group metal to a lower oxidation state. To increase the conversion, a redox agent can be employed to return the platinum metal to its higher oxidation state for further reaction. In one embodiment of the invention, the method can be practiced continuously by the simultaneous introduction of oxygen with the carbon monoxide and olefin reactants. In other embodiments of the invention, the process can be operated discontinuously with intermittent oxidation and carbonylation reactions occurring to regenerate and reduce the catalyst.

The following reactions occur during the reaction:

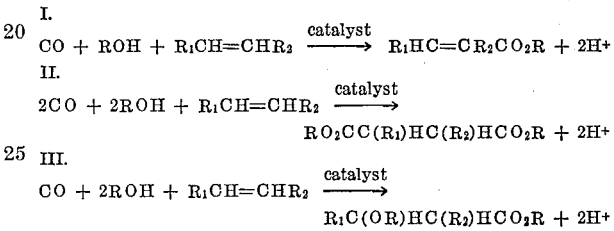

wherein:

The catalyst comprises a platinum group metal in a high oxidation state with optional presence of a salt of a multivalent metal having an oxidation potential more positive than the platinum group metal;
R can be alkyl, aryl, alkaryl or aralkyl;
$R_1$, $R_2$ and $R_3$ can be hydrogen, alkyl, aryl, alkaryl, aralkyl; and
X is a suitable anion.

Preferably, the catalyst also contains a soluble salt of a multivalent metal which functions as a redox agent.

In its simplest embodiment, the hydrocarbon olefin is ethylene, the alcohol is methanol, the anion is chloride and the resultant esters are methyl acrylate, dimethyl succinate, and methyl beta-methoxypropionate. In other embodiments, the hydrocarbon olefin can be propylene and the resultant product will comprise crotonates, beta-alkoxy butyrates, and pyrotartarates. Higher olefins, of course, yield the higher homologs of these esters.

The reaction can be conducted under relatively mild conditions, e.g., 0° to about 300° C. and pressures from about atmospheric to 2500 p.s.i.g. while vapor phase reactions with a supported catalyst on an inert carrier such as alumina, silica, titania, zirconia, aluminum silicates, etc., can be used, preferably the pressure is sufficient to maintain a liquid phase in the reaction zone. The reaction, which is performed under anhydrous or substantially anhydrous conditions, results in the stoichiometric reduction of redox agent to its lower oxidation state as shown in the aforementioned reaction.

The reduced form of the redox agent, e.g., cuprous chloride, can be regenerated in plurality of methods so as to provide a continuous preparation of the acrylate product. Oxygen, ozone, or other oxygen-containing oxidizing agents can be employed to regenerate the redox agent. In this practice, the reaction can be conducted until substantially all the redox agent has been reduced. The acrylate product can be then be separated from the reaction zone and the reduced solution thereafter contacted with an oxygen-containing gas to return the redox agent to its higher oxidation state. Prior to reuse of the catalyst solution, however, the water formed in the oxygen reoxidation of the redox agent is removed from the solution. Any conventional technique for eliminating water or for dehydrating an alcoholic solution can be employed for this step.

In alternative regeneration techniques, the redox agent can be contacted with an elemental halogen, e.g., chlorine, bromine, etc., to oxidize it to its higher oxidation state, a reaction that does not produce water. The contacting of the reaction medium with the halogen can be performed simultaneously with the contacting by the hydrocarbon olefin or, if desired, performed in a separate regeneration step.

In a second alternative processing technique, the redox agent can be reoxidized to its higher oxidation state by electrolysis, e.g., by employing the redox agent in a solution as an anolyte in an electrolytic cell and removing electrons therefrom by the application of an external voltage to the cell, thus maintaining it in its higher oxidation state. This technique can be performed simultaneously with the contacting of the solution by the hydrocarbon olefin or performed in a separate regeneration step.

I have also found that the reaction need not be maintained under completely anhydrous conditions but that the preparation of the aforedescribed esters can proceed smoothly so long as the reaction conditions are substantially anhydrous, i.e., the reaction solvent can contain up to about 10 weight percent water. Preferably, the solvent contains no more than about 5 weight percent water. It is therefore possible to conduct the regeneration and carbonylation reaction simultaneously to provide a continuous method for the oxidative carbonylation of the olefins in a single reaction zone, the water formed in maintaining the activity of the catalyst solution being tolerated in the system. Provision is made of course for continuously withdrawing a portion of the liquid contents of the reaction zone so as to continuously remove the organic products, water and reaction medium and thereby maintain a constant inventory of water in the reaction zone below the aforementioned limits.

Referring now to the alcoholic reactant which, preferably, is also the reaction medium, any alkyl, cycloalkyl, aryl, alkaryl or aralkyl monohydroxy alcohol having from about 1 to 20 carbons can be employed. Preferably, aliphatic alcohols having about 1 to 6 carbons are used such as methanol, ethanol, propanol, isopropanol, butanol, isobutanol, pentanol, isopentanol, hexanol, heptanol, octanol, nonyl, decanol, etc. Cyclic alcohols such as cyclohexanol, cyclopentanol, 2 - ethylcyclohexanol, etc., can be employed. Phenol, naphthol, ortho, meta or para cresol, cumenol, xylenol, etc., can also be employed if desired.

As previously mentioned, the alcohol is preferably used in excess and thus comprises the reaction medium. If desired, however, other organic solvents which are liquid at the reaction conditions and inert to the reactants and products can also be employed. Such solvents include for example: various ethers such as methyl ethyl ether, diethyl ether, diisopropyl ether, dichloroethyl ether, ethylene glycol diisoamyl ether, ethyl phenyl ether, diethylene glycol diethyl ether, triethylene glycol diethyl ether, tetraethylene glycol dimethyl ether, etc.

Various esters can also be employed as the solvents such as methyl formate, ethyl formate, methyl acetate, ethyl acetate, n-propyl formate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, furfural acetate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The acid portion of the ester produced in accordance with my invention is derived from the olefin. When an ester of an unsaturated acid is prepared, the acid portion contains one more carbon than the olefin. When an ester of a dicarboxylic acid is produced according to reaction II the acid portion contains two more carbons than the olefin. When an ester is produced according to reaction III, the acid contains a beta-alkoxy group and a carbon chain having one more carbon than the olefin. Accordingly, the identity of the product desired dictates the choice of the hydrocarbon olefin; acrylates, succinates and alkoxy propionates requiring the use of ethylene. Esters of higher acids, however, can be obtained from other olefins and the following are typical of hydrocarbon olefins which can be reacted: ethylene, propylene, butene - 1, butene - 2, isobutene, pentene - 1, pentene - 2, 2 - methylbutene - 1, 2 - methylbutene - 2, cyclopentene, hexene - 1, hexene - 2, hexene - 3, cyclohexene, 2 - ethylbutene - 1, 2 - methylpentene - 1, heptene - 3, 2 - ethylhexene - 3, cycloheptene, 1 - methylcyclohexene, 1 - octene, isooctene, cyclooctene, 1 - ethylcyclohexene, 1 - nonene, isononene, 1 - decene, 1 - butylcyclohexene, 1,3 - diethylcyclohexene, isodecene, indene, styrene, alpha - methylstyrene, allylbenzene, etc. In general, any hydrocarbon olefin having from about 2 to about 20 carbons, preferably from about 2 to about 6 carbons, can be employed in the reaction provided that at least one of the unsaturated carbons is bonded to a hydrogen to form an available oxidation site.

The reaction is performed at temperatures from about 0° to 300° C., preferably from about 25° C. to about 325° C. and pressures sufficient to maintain liquid phase conditions. Preferably, elevated pressures to increase the solubility of the gaseous reactants in the reaction medium are employed, e.g., pressures from about 100 to about 2500 p.s.i.g.; most preferably from about 500 to about 1000 p.s.i.g. are employed. As previously mentioned, the reaction is performed by introducing the hydrocarbon olefin and carbon monoxide into contact with the alcoholic reaction medium which contains dissolved quantities of a soluble cupric salt and a platinum group metal.

The platinum group metal can be of the platinum subgroup, i.e., platinum, rhodium or ruthenium or of the palladium sub-group, i.e., palladium, uranium or osmium. Palladium is preferred because of its demonstrated greater activity. In general, the platinum group metal can be employed in amounts between about 0.001 and 5.0 weight percent of the liquid reaction medium; preferably between about 0.04 and about 0.5 weight percent. The platinum group metal can be introduced into the reaction medium as a finely divided metal, as a soluble salt or as a chelate. Examples of suitable salts are the halides, sulfates, nitrates, and salts of the lower ($C_1$–$C_5$) carboxylates such as palladium chloride, rhodium acetate, ruthenium bromide, osmium oxide, iridium nitrate, palladium sulfate, platinum acetate, etc. Examples of suitable chelates are palladium acetylacetonate and complexes of the aforementioned platinum group metal ions with such conventional chelating agents as citric acid, ethylene diamine tetraacetic acid, etc.

As previously mentioned, various redox compounds can optionally be used in the reaction medium to accelerate the rate of reaction. In general, from about 1 to 25 weight percent of any multivalent metal salt having an oxidation potential higher, i.e., more positive than the platinum metal in the solution, can be used. Typical of such are the soluble salts of the multivalent metal ions such as the $C_1$ to $C_5$ fatty acid carboxylates, e.g., propionates, valerates, acetates, etc.; nitrates, sulfates; halides, e.g., bromides, chlorides, etc.; of copper, iron, manganese, cobalt, mercury, nickel, cerium, uranium, bismuth, tantalum, chromium, molybdenum, or valadium. Of these, cupric and ferric salts are preferred and cupric salts are most preferred. Examples of the preferred cupric salts are cupric chloride, cupric bromide, cupric iodide, cupric fluoride, cupric nitrate, cupric sulfate, cupric acetate, cupric valerate, etc. The cupric salt can be employed in any desired amount, the higher concentrations being capable of effecting a higher conversion before requiring regeneration since, as the reaction illustrates, a stoichiometric quantity of the cupric salt is reduced to a cuprous salt in the oxidation. In general, the alcoholic reaction medium can contain from about 1 weight percent of any of the aforementioned multivalent metal salts up to and exceeding the saturation of the salt. In this fashion the reaction medium can comprise a supersaturated slurry of a salt of the multivalent metal. During the reaction, the soluble multivalent metal cations are reduced to a lower oxidation state and precipitate with fresh salt dissolving until the entire inventory of the high valency state of the multivalent metal has been reduced. In this fashion, slurries containing up to 80 weight percent of the metal salt, particularly of the cupric salts, can be employed. This technique is desirable when employing separate regeneration of the cuprous salt so as to extend run lengths prior to the necessary regeneration. Preferably, the concentration of the cupric salt is from about 5 to about 20 weight percent and, when the reaction is performed simultaneously with a non-oxygen regeneration of the cuprous salt, the solubility of the cupric salt is not exceeded.

The reaction proceeds by a mechanism wherein the platinum metal is reduced to a lower oxidation state and then is oxidized by the redox agent. To facilitate this oxidation and thereby increase the rate of reaction, I prefer to employ a reaction medium that contains between about 0.05 and 5.0 weight percent free or coordinately bonded or covalently bonded halogen in the reaction zone. Preferably, concentrations between about 0.1 and 3.0 weight percent are employed. This amount of halogen is preferably also in excess of the stoichiometric quantity necesrary to form the halide of the most oxidized state of platinum group metal, e.g., in excess of two atomic weights of halogen per atomic weight of palladium present. In this manner, a rapid oxidation can be achieved. The halogen can be added as elemental chlorine or bromine; however, it is preferred to employ less volatile halogen compounds such as hydrogen, alkali metal or ammonium halide, e.g., hydrogen chloride, hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent metal redox salts are employed, these too can be added as the chloride or bromide. Various organic compounds which liberate chlorine, bromine, hydrogen chloride or bromide under the reaction conditions can also be used, such as aliphatic chlorides or bromides, e.g., ethyl bromide, propyl chloride, butyl chloride, benzyl bromide, phosgene, etc.

The regeneration can be performed during the reaction or in a separate regeneration step. Although it is preferred to maintain the reaction under anhydrous conditions, I have found that a continuous oxidative carbonylation reaction can be achieved by simultaneously introducing oxygen with the olefin and carbon monoxide. As previously mentioned, the water formed in the oxygen oxidation of the reduced catalyst accumulates in the reaction medium and the reaction can nevertheless be performed provided that the water content is maintained less than about 10 weight percent of the reaction medium. Other methods of oxidation of the cuprous to cupric salt, however, can be simultaneously performed with the reaction. To illustrate, a halogen can be used as the oxidizing agent such as chlorine or bromine by simultaneously introducing the halogen into the reaction zone. Under the aforementioned reaction conditions, the cuprous salt is oxidized by the halogen to cupric halide.

If desired, a suitable dehydrating agent can be used to maintain the reaction under anhydrous conditions. Examples of suitable organic dehydrating agents which, for ease of handling, have from 2 to about 25 carbons are: alkyl and aryl isocyanates such as methyl isocyanate, benzene isocyanate, toluidene diisocyanate, amyl isocyanate, isooctyl isocyanate, etc.; N,N'-alkyl and aryl-substituted carbodiimides such as N,N-dimethyl carbodiimide, N,N'-diethyl carbodiimide, N,N'-diisopropyl carbodiimide, N,N'-dibutyl carbodiimide, N-amyl, N'-methyl carbodiimide, N,N'-dicylohexyl carbodiimide, N,N'-diphenyl carbodiimide, N,N'-dibenzyl carbodiimide, etc.; alkyl acetals and ketals such as 1,1-diethoxyethane, 1,1-dibutoxyethane, 2,2-dimethoxypropane, 2,2-diethoxybutane, 3,3-diisopropoxypropane, 3,3-dipentoxyhexane, 1,1-dimethoxycyclohexane, etc.; alkyl orthoesters such as ethyl orthoformate, methyl orthoformate, butyl orthoacetate, ethyl orthoacetate, etc.

The reduced state of the multivalent metal, e.g., the cuprous salts, can readily be reoxidized to its higher valency, e.g., cupric, by conducting the reaction in the anode chamber of the electrolytic cell and applying a voltage between the electrodes so as to remove electrons from the anode chamber, i.e., from the cuprous ions and thereby oxidize these ions to cupric. In this embodiment, the catholyte preferably comprises an aqueous hydrogen halide solution and hydrogen is liberated at this cathode with the halide ions passing through a salt bridge or other permeable diaphragm between the cells.

As previously mentioned, the oxidation of the reduced cuprous salt solution can be effected in a step separate from the reaction step where the olefin and carbon monoxide are contacted with the solution. In this operation, oxygen or an oxygen-containing oxidizing compound can be employed to regenerate the curpous ion. A suitable regeneration comprises introducing a stream of oxygen or mixture of oxygen and an inert gas, e.g., nitrogen, air, etc., into contact with the catalyst solution which has become reduced from previous contacting with the olefin and carbon monoxide. Temperatures from about 20° to about 250° C. are sufficient for this operation and the pressures employed are sufficient to maintain the alcoholic reaction medium in the phase, e.g., atmospheric to about 2000 p.s.i.g. Because the oxygen oxidation of the solution forms water, steps must be taken to dehydrate the solution before again contacting it with the olefin and carbon monoxide. Preferably, the water is vaporized from the reaction medium and this vaporization can be facilitated by stripping the reaction medium within an inert gas such as combustion gases, nitrogen, etc., or by continuing to introduce oxygen or air into the solution after oxidation has been effected to strip the water from the solution. Preferably, to facilitate removal of the water, the pressure can be subatmospheric, atmospheric or slightly elevated above atmospheric e.g., from about 20 millimeters mercury to about 10 atmospheres. All or a portion of the water can also be removed by the addition of sufficient quantities of any of the aforementioned dehydrating agents.

When the alcoholic reactant is more volatile than water, it is apparent that the volatilization of water from this solution of necessity removes such alcoholic reactant. Accordingly, it is preferred when employing such alcoholic reactants in the oxygen regeneration scheme to employ a second reaction medium which is less volatile than water. This medium will retain the catalyst salts in solution. The alcoholic reactant vaporized from the medium in the water removal step is returned to the reaction medium during the reaction. Any of the aforementioned solvents having a lesser volatility than water can be employed for this purpose or, if desired, any of the aforementioned alcoholic reactants higher boiling than water can be employed.

As previously mentioned, the reaction forms the esters of an unsaturated acid, dicarboxylic acid and/or beta-alkoxyalkanoic acid, cuprous chloride and hydrogen chloride. When operating in a continuous fashion, a portion of the liquid reactants can be continuously removed from the reaction zone and the esters purified therefrom. A suitable purification step comprises, e.g., azeotropic distillation of the liquid to remove the esters and alcoholic reactant if they form or azeotrope from the balance of the alcohol which is returned to the reaction zone. When the particular alcohol and ester do not form an azeotorpe, any other know azeotroping agent can be added to obtain the ester in the volatile fraction from the crude product.

Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

To permit a continuous reaction when using a separate regeneration step, a portion of the catalyst salts can also be withdrawn, preferably in admixture with the liquid product and, after recovery of the ester product, the catalyst is regenerated by any of the aforementioned separate regeneration schemes. The regenerated solution can then be recycled to the oxidation zone.

Various mechanical designs of the reaction zone can be employed. Two or more vessels can be employed while alternating or switching of the reaction and regeneration between the vessels so that a continuous production of the ester can be achieved. When using the non-oxygen oxidizing agent or when using the electrolytic oxidation, the reaction and regeneration can be performed simultaneously in a single vessel. Such vessel can be equipped with a cooling means and stirrer to insure adequate contacting of the gas and liquid within the reaction zone.

Various mechanical designs of electrolytic cells can be used in the oxidation. In general, such cells comprise two chambers which are separated by a porous diaphragm to prevent a mixture of the electrolytes. These chambers are preferably equipped with mechanical stirrers and heating or cooling elements to maintain the desired reaction temperature. The anode chamber can be composed of or lined with stainless steel or any other similar corrosion resistant material. The anode can be carbon or any inert metal, i.e., any metal having an oxidation potential more negative than the oxidizing potential of the cupric ion in the anolyte. Generally, carbon electrodes are preferred.

The cathode chamber can be constructed of or lined with stainless steel or other similar corrosion resistant metals; however, mild or carbon steel can also be used when the walls of the cathode chamber are employed as the cathode by applying the negative potential of the cell thereto. In this method, current densities greater than about 0.4 ampere per square centimeter can be used in this chamber and at this current density. Substantially no corrosion of the mild steel will occur.

The cell chambers are separated by a membrane which prevents mixing of the anolyte and catholyte, yet which is sufficiently porous to permit passage of current conducting anions, particularly halide anions as hereafter described. In general, various ceramic materials such as fritted glass or sintered glass powders can be used. Other suitable membranes can be porous or foamed plastics such as Teflon, asbestos, etc.

The mechanical deign of the cell can be widely varied. The cell can comprise separate vessels in juxtaposition communicating with each other by a salt bridge or common arm which contains the porous membrane. If desired, the chambers can be provided within a single vessel by dividing the vessel with a wall, a portion or all of which comprises the aforementioned porous membrane. In a preferred design, the chambers are concentrically positioned cylinders having a steel outer vessel to be used as the cathode and an inner concentric cylinder composed of the porous membrane. Within the latter is disposed a carbon rod which, preferably, is fluted to expose a maximum surface area which is used as the anode. An inlet for the olefin and anolyte and an outlet for removal of the anolyte and product are provided interiorly of the porous membrane, i.e., in the anode chamber, and a gas outlet is provided in the annular chamber between the porous membrane and the outer vessel, i.e., in the cathode chamber.

The electrolytic processing can conveniently be performed in the aforementioned or any conventional electrolytic cell by using an anolyte that comprises, preferably, an anhydrous reaction medium containing any of the aforementioned alcohols alone or in admixture with any of the aforementioned solvents. The anhydrous state can be assured by use of from 1 to 50, preferably 1 to 15 percent of any of the aforementioned dehydrating agents. The anolyte also contains a soluble salt of the aforementioned platinum metals, and, preferably, a soluble salt of one of the aforementioned multivalent metals, these salts being used in the previously set forth concentrations.

During the reaction, the olefin, an alcohol and carbon monoxide are charged, preferably continuously, to the anode chamber. There occurs during the reaction a net formation of hydrogen cations as well as desired unsaturated ester product in the anode chamber, released from the alcoholic reactant in the ester formation. In a preferred process, the anolyte also contains the aforementioned quantities of a halide anion. When the product is recovered, e.g., either by vaporization or stripping from the anode chamber or by withdrawal of a portion of the liquid anolyte and subsequent distillation, the volatile hydrogen halide is also removed from the liquid anolyte. In this fashion, the pH of the anolyte can be readily maintained constant at the desired initial value despite the net formation of hydrogen cations in the reaction. To furnish the halide anion to the anolyte, the cathode chamber can contain an alcoholic or other organic solvent solution of hydrogen halide. Hydrogen will be produced by the reduction in the cathode and the halide anions will pass through the diaphragm cell divider as the current conducting species, thereby maintaining a constant halide concentration in the anolyte. The hydrogen halide volatilized during product recovery can of course be introduced into the cathode chamber. In this fashion, an electrolytic process is devised for the continuous production of an unsaturated ester from an olefin, carbon monoxide and an alcohol.

The following examples will illustrate a mode of practice of my invention and demonstrate the results obtainable therefrom Example 1

Into a 300 milliliter pressure vessel were placed one part palladium chloride, 20 parts anhydrous cupric chloride and 300 milliliters methanol. The vessel was pressured with ethylene to 600 p.s.i.g. and carbon monoxide was added to increase the pressure to 1200 p.s.i.g. The bomb was rocked while heating to 120° C. and held at that temperature for four hours. At the end of the four-hour period the final pressure was 600 p.s.i.g., indicating absorption or reaction of the gaseous reactants. The bomb was then cooled, depressured and opened and the liquid contents filtered to separate insoluble cuprous chloride. The filtrate was distilled to obtain a product having a boiling point of about 61° C. corresponding to the boiling point of the methanol-methyl acrylate azeotrope. The distillate was identified to be the azeotrope by gas chromatography and gave a positive bromine test. The material readily polymerized to a viscous liquid upon standing.

Example 2

The pressure vessel was charged with one gram palladium chloride, 20 grams anhydrous cupric chloride and 100 milliliters of n-butanol. Ethylene was introduced until the pressure was 500 p.s.i.g., then carbon monoxide until the pressure was 1000 p.s.i.g. The vessel was rocked and heated to 120° C. and held at that temperature for 4 hours when the pressure had declined to 300 p.s.i.g. The vessel was cooled, depressured and opened and its contents filtered. The filtrate was distilled to recover 13 grams n-butyl acrylate and 3 grams n-butyl beta-n-butoxyproprionate.

When the experiment was repeated with cupric chloride dihydrate in lieu of the anhydrous salt, a slower oxidation occurred to yield 3 grams n-butyl acrylate.

Example 3

To 200 parts triethyl orthoformate, 200 parts absolute ethanol, 5 parts cupric chloride, 5 parts lithium chloride and 1 part palladium chloride in a one-half gallon autoclave were added ethylene to 400 p.s.i.g. and then carbon monoxide to 900 p.s.i.g. The autoclave was heated to 125° C. and maintained at this temperature over a two hour period during which time the contents were stirred and oxygen was slowly introductd in 20 p.s.i. increments. There occurred a 151 part weight increase. The autoclave was cooled, opened and the contents were distilled to separate ethyl formate, and products comprising 117 parts diethyl succinate, boiling point 215°–217° C. refractive index of 1.4200 and 16 parts ethyl acrylate. The succinate ester was hydrolyzed to succinic acid, melting point 185°–187° C.

Example 4

To 400 parts butanol, 1 part palladium chloride, 5 parts lithium chloride and 5 parts cupric chloride in a one-half gallon autoclave were added ethylene to 400 p.s.i.g. and then carbon monoxide to 900 p.s.i.g. The autoclave was stirred and heated to 150° C. and maintained at that temperature while oxygen was added in 10 increments of 200 p.s.i. each. There occurred a 65 gram weight increase and the reaction medium was distilled to recover 23 parts dibutyl succinate, boiling point 135° C. at 20 millimeters mercury and refractive index of 1.4340 at 25° C.

Example 5

The procedure of Example 4 was repeated with 400 milliliters methanol in lieu of the butanol previously employed and with 2 grams of palladium chloride. A 45 gram weight increase was achieved and the reaction products were distilled to recover 31 grams of dimethyl succinate, boiling point 70°–73° C. at 4 millimeters mercury, refractive index of 1.4184 at 24° C. together with slight amounts of methyl acrylate.

Example 6

The procedure of Example 4 was repeated except propylene was substituted for ethylene. The crude reaction product was distilled to obtain dibutyl pyrotartarate, boiling point 86° C. at one millimeter mercury.

Example 7

The procedure of Example 3 was repeated with the use of propylene in lieu of the ethylene employed in Example 3. The reaction products were distilled to obtain 20 grams ethyl crotonate, 3 grams ethyl methacrylate and diethyl methylsuccinate, boiling point 80° C. at 2 millimeters mercury.

Example 8

To 400 parts butanol, 1 part palladium chloride, 5 parts lithium chloride, 5 parts cupric chloride and 150 parts trimethyl orthoformate in a one-half gallon autoclave were added ethylene to 400 p.s.i. and then carbon monoxide to 900 p.s.i The mixture was heated to 125° C. and oxygen was introduced at 20 p.s.i. increments until a total of 200 p.s.i. oxygen had been added. The autoclave was cooled and the contents distilled to recover 55 grams dibutyl succinate, boiling point 87°–90° C. at 3 millimeters mercury, refractive index 1.4342 at 24° C. and a carbon hydrogen analysis of 62.1 and 9.4 weight percent, respectively, corresponding to the calculated values at 62.4 and 9.6. The product was hydrolyzed to recover n-butanol and succinic acid.

Example 9

To 15 grams phenol, 30 grams cupric chloride, 100 milliliters ethyl acetate and 1 gram palladium chloride in a 300 milliliter capacity bomb was added ethylene to 400 p.s.i. and then carbon monoxide to 1000 p.s.i. The mixture was heated to 125° C. and maintained at that temperature for 4 hours while the bomb was slowly rocked to stir the contents. The final pressure was 400 p.s.i. The autoclave was cooled, opened and the contents distilled to recover 12 grams phenyl acrylate.

Example 10

The electrolytic carbonylation of ethylene to ethyl acrylate and diethyl succinate was performed in an electrolytic cell having an anode chamber formed from a flask with a side outlet at the base thereof connected through a salt bridge to a second flask which served as the cathode chamber. The anode chamber was fitted with a stirrer, thermometer and a glass tube for the introduction of ethylene. The vapor space of the anode was connected through a side outlet to a vertically positioned water-cooled condenser so that the liquid condensate refluxed to the anode chamber. The vapor effluent from the water condenser was passed into a wet ice-cooled trap and finally through two Dry Ice acetone cooled traps. A heating tape was wrapped around the anode chamber and connected to a variable transformer for control of the temperature of the anolyte. A fritted glass diaphragm was inserted in the salt bridge between the anode and cathode chambers. A palladium gauze electrode was employed in the anode chamber and a pool of mercury was employed as the cathode in the cathode chamber. The electrodes were connected by an externally controlled direct current power supply.

The anode chamber was charged with an anolyte comprising 100 grams absolute ethanol containing 29 grams lithium chlorate, 2 grams cupric chloride and 100 milliliters triethyl orthoformate. The cathode chamber was charged with 120 milliliters of an absolute ethanol solution saturated with lithium chloride and containing 3 milliliters of a 70 percent perchloric acid solution and 10 milliliters of triethyl orthoformate. Ethylene and carbon monoxide were slowly introduced into the anode chamber at room temperature. The reaction was continued for a period of 60 hours and the anolyte was distilled to recover 52 grams ethyl beta-ethoxy propionate which represents a yield of 40 percent based on electrolytic regeneration.

The preceding examples are set forth solely to illustrate a mode of practice of my invention and to demonstrate the results obtainable thereby. The examples are not intended to be unduly limiting of my invention which is intended to be defined by the steps and the agents, or their apparent equivalents, set forth in the following claims.

I claim:

1. The continuous oxidative carbonylation of a hydrocarbon olefin having from 2 to about 20 carbons to an ester selected from the class consisting of esters of unsaturated carboxylic acids having one more carbon than said olefin, esters of dicarboxylic acids having two more carbons than said olefin, esters of beta-alkoxy substituted carboxylic acids having one more carbon in the carboxylic acid portion than said olefin, which method comprises: contacting said olefin, carbon monoxide and oxygen under substantially anhydrous reaction conditions with a monohydroxy alcohol having from about 1 to about 20 carbons and a catalytic amount of a salt or chelate selected from a class consisting of acetyl acetonate, citric acid and ethylene diamine tetraacetic acid chelates of a platinum group metal in an elevated oxidation state and a salt of multivalent metal having an oxidation potential more positive than said platinum group metal, at a temperature from about 0° to about 300° C. and a pressure from atmospheric to about 2500 p.s.i.g. to form said ester.

2. The carbonylation of claim 1 wherein said platinum group metal is palladium and said multivalent metal is copper.

3. The carbonylation of claim 1 wherein said olefin is ethylene, said alcohol is an aliphatic alcohol having 1 to about 6 carbons and said ester is an alkyl acrylate.

4. The oxidative carbonylation of claim 1 wherein said contacting is effected at a pressure from 100 to about 2500 p.s.i.g. with a substantially anhydrous reaction medium containing said alcohol and soluble salts of said platinum group metal and said multivalent metal.

5. The continuous oxidative carbonylation of a hydrocarbon olefin having from 2 to about 20 carbons to an ester selected from the class consisting of esters of unsaturated carboxylic acids having one more carbon than said olefin, esters of dicarboxylic acids having two more carbons than said olefin, esters of beta-alkoxy substituted carboxylic acids having one more carbon in the carboxylic acid portion than said olefin and mixtures thereof, said process comprising:
(1) contacting said olefin and carbon monoxide with a monohydroxy alcohol having one to about 20 carbons in the presence of catalytic amounts of a soluble salt or chelate selected from the class consisting of acetyl acetonate, citric acid and ethylene diamine tetraacetic chelates of a platinum group metal and a salt of a multivalent metal having an oxidation potential more positive than said platinum group metal, at a temperature from 25° to about 325° C. to reduce said multivalent metal to a lower oxidation state and thereby form said ester; and
(2) oxidizing said multivalent metal to a higher oxidation state for repeated reaction by contacting said multivalent metal with oxygen at a temperature from about 20° to about 250° C.

6. The carbonylation of claim 5 wherein said platinum group metal is palladium and said multivalent metal is copper.

7. The carbonylation of claim 5 wherein said olefin is ethylene, said alcohol is an aliphatic alcohol having 1 to about 6 carbons and said ester is an alkyl acrylate.

8. The oxidative carbonylation of claim 5 wherein said contacting is effected at a pressure from 100 to about 2500 p.s.i.g. with a substantially anhydrous reaction medium containing said alcohol and soluble salts of said platinum group metal and said multivalent metal.

References Cited
UNITED STATES PATENTS

| | | | |
|---|---|---|---|
| 3,040,090 | 6/1962 | Alderson et al. | 260—486 XR |
| 3,065,242 | 2/1962 | Alderson | 260—486 |
| 3,309,403 | 3/1967 | Mador et al. | 260—544 |
| 3,338,961 | 8/1967 | Closson et al. | 260—486 XR |
| 3,221,045 | 11/1965 | McKeon et al. | 260—497 |

OTHER REFERENCES

Tsuji et al.: Part I, Tetrahedron Letters, No. 16, pp. 1061–1064 (1963).

Tsuji et al.: Part II, Tetrahedron Letters, No. 22, pp. 1437–1440 (1963).

Tsuji et al.: Part IX, J. Am. Chem. Soc., p. 4491 (October 1964).

LORRAINE A. WEINBERGER, *Primary Examiner.*

A. P. HALLUIN, *Assistant Examiner.*